(12) United States Patent
Jenkins

(10) Patent No.: US 7,346,709 B2
(45) Date of Patent: Mar. 18, 2008

(54) METHODS FOR ASSIGNING RINGS IN A NETWORK

(75) Inventor: David W. Jenkins, North Aurora, IL (US)

(73) Assignee: Tellabs Operations, Inc., Naperville, IL (US)

( * ) Notice: Subject to any disclaimer, the term of this patent is extended or adjusted under 35 U.S.C. 154(b) by 780 days.

(21) Appl. No.: 10/230,004

(22) Filed: Aug. 28, 2002

(65) Prior Publication Data

US 2004/0073638 A1 Apr. 15, 2004

(51) Int. Cl.
G06F 15/16 (2006.01)
H04L 12/58 (2006.01)

(52) U.S. Cl. .................... 709/251; 370/255; 370/258

(58) Field of Classification Search ........ 709/220–223, 709/251; 370/254–258; 398/59
See application file for complete search history.

(56) References Cited

U.S. PATENT DOCUMENTS

| 5,412,652 | A | * | 5/1995 | Lu | 370/223 |
|---|---|---|---|---|---|
| 5,515,367 | A | | 5/1996 | Cox, Jr. et al. | |
| 5,535,038 | A | | 7/1996 | Hinch | 359/180 |
| 5,546,542 | A | * | 8/1996 | Cosares et al. | 709/241 |
| 5,563,877 | A | | 10/1996 | Van Tetering et al. | 370/58.2 |
| 5,564,021 | A | * | 10/1996 | Qiu et al. | 370/460 |
| 5,657,142 | A | | 8/1997 | Fahim | 359/110 |
| 5,706,276 | A | | 1/1998 | Arslan et al. | 370/216 |
| 5,715,432 | A | | 2/1998 | Xu et al. | 395/500 |
| 5,717,693 | A | | 2/1998 | Baydar et al. | 370/514 |
| 5,729,692 | A | * | 3/1998 | Qiu et al. | 709/241 |
| 5,742,605 | A | * | 4/1998 | Norman, Jr. | 370/405 |
| 5,742,774 | A | | 4/1998 | Al-Salameh et al. | 395/200.81 |
| 5,784,557 | A | * | 7/1998 | Oprescu | 709/220 |
| 5,793,225 | A | | 8/1998 | Gerson | 326/68 |

(Continued)

OTHER PUBLICATIONS

Hanan Luss, Topological Network Design for SONET Ring Architecture, IEEE Transactions on System, Man & Cybernetics-Part A: Systems & Humans, 1988, pp. 780-790, vol. 28, No. 6.

(Continued)

*Primary Examiner*—George C. Neurauter, Jr.
(74) *Attorney, Agent, or Firm*—Cheryl Fernandez; Tellabs Law Department

(57) ABSTRACT

A method for managing nodes in a network includes assigning to a cycle set a cycle having a size of n, the preferred maximum nodes per cycle, or smaller. If this cycle set does not include the all of the nodes in the network, the method includes increasing n by one and assigning to the cycle set a cycle that accesses at least one of the nodes not currently in the cycle set and has a size n, until the cycle set includes all of the nodes in the network. The method further includes moving from the cycle set to a final set a cycle that accesses a node that is accessed by only that particular cycle. If this final set does not include all of the nodes in the network, the method includes moving a remaining cycle from the cycle set to the final set wherein the remaining cycle carries a largest intracycle traffic among cycles in the cycle set, until the final set includes all of the nodes in the network. Finally, the method includes designating the cycles in the final set as the cycles connecting the nodes in the network.

17 Claims, 9 Drawing Sheets

U.S. PATENT DOCUMENTS

| | | | |
|---|---|---|---|
| 5,793,753 A | 8/1998 | Hershey et al. | 370/252 |
| 5,821,937 A | 10/1998 | Tonelli et al. | 345/356 |
| 5,831,610 A | 11/1998 | Tonelli et al. | 345/335 |
| 5,903,370 A | 5/1999 | Johnson | 359/119 |
| 5,923,646 A * | 7/1999 | Mandhyan | 370/254 |
| 5,923,653 A | 7/1999 | Denton | 370/375 |
| 5,930,016 A | 7/1999 | Brorson et al. | 359/127 |
| 6,021,113 A | 2/2000 | Doshi et al. | 370/228 |
| 6,026,088 A | 2/2000 | Rostoker et al. | 370/395 |
| 6,031,840 A | 2/2000 | Christie, deceased et al. | 370/410 |
| 6,038,044 A | 3/2000 | Fee et al. | 359/119 |
| 6,038,678 A | 3/2000 | Fukushima et al. | 714/4 |
| 6,061,335 A | 5/2000 | De Vito et al. | |
| 6,073,248 A | 6/2000 | Doshi et al. | 714/4 |
| 6,081,525 A | 6/2000 | Christie et al. | 370/392 |
| 6,092,117 A | 7/2000 | Gladwin et al. | 709/239 |
| 6,094,417 A * | 7/2000 | Hansen et al. | 370/222 |
| 6,098,094 A | 8/2000 | Barnhouse et al. | 709/203 |
| 6,101,012 A | 8/2000 | Danagher et al. | 359/127 |
| 6,104,699 A | 8/2000 | Holender et al. | 370/235 |
| 6,115,517 A | 9/2000 | Shiragaki et al. | 385/24 |
| 6,115,825 A | 9/2000 | Laforge et al. | 713/400 |
| 6,125,111 A | 9/2000 | Snow et al. | 370/360 |
| 6,130,764 A | 10/2000 | Taniguchi | 359/119 |
| 6,130,876 A | 10/2000 | Chaudhuri | 370/228 |
| 6,141,318 A | 10/2000 | Miyao | 370/217 |
| 6,163,527 A * | 12/2000 | Ester et al. | 370/228 |
| 6,167,062 A | 12/2000 | Hershey et al. | 370/503 |
| 6,178,025 B1 | 1/2001 | Hardcastle et al. | 359/177 |
| 6,192,174 B1 | 2/2001 | Lee | 385/24 |
| 6,223,074 B1 | 4/2001 | Granger | 600/544 |
| 6,229,815 B1 * | 5/2001 | Huang et al. | 370/437 |
| 6,324,162 B1 | 11/2001 | Chaudhuri | 370/225 |
| 6,330,245 B1 * | 12/2001 | Brewer et al. | 370/424 |
| 6,331,905 B1 | 12/2001 | Ellinas et al. | 359/110 |
| 6,396,852 B1 * | 5/2002 | Simmons | 370/535 |
| 6,567,429 B1 | 5/2003 | DeMartino | 370/539 |
| 6,654,379 B1 | 11/2003 | Grover et al. | 370/406 |
| 6,728,205 B1 | 4/2004 | Finn et al. | 370/217 |
| 6,819,662 B1 * | 11/2004 | Grover et al. | 370/351 |
| 6,826,158 B2 * | 11/2004 | Seaman et al. | 370/254 |
| 6,941,359 B1 * | 9/2005 | Beaudoin et al. | 709/221 |
| 7,133,410 B2 | 11/2006 | Chow et al. | 370/404 |
| 2001/0012298 A1 * | 8/2001 | Harshavardhana et al. | 370/405 |
| 2002/0036988 A1 * | 3/2002 | Cardwell et al. | 370/238 |
| 2002/0118687 A1 | 8/2002 | Chow et al. | |
| 2003/0167348 A1 * | 9/2003 | Greenblat | 709/251 |
| 2004/0057444 A1 * | 3/2004 | Brewer et al. | 370/403 |
| 2004/0162718 A1 * | 8/2004 | Watkins et al. | 703/21 |
| 2004/0208578 A1 * | 10/2004 | Kinoshita et al. | 398/83 |

OTHER PUBLICATIONS

Cosares, et al. "SONET Toolkit: A Design Support System for Designing Robust and Cost Effective Fiber-Optic Networks", Interfaces, Jan.-Feb. 1995 (pp. 20-40), vol. 25, Issue 1, Institute for Operations Research and The Management Sciences.

Chan, K., et al., "Analysis of Least Congested Path Routing in WDM Lightwave Networks", INFOCOM 1994, Networking for Global Communications. 13th Proceedings IEEE. Jun. 12-16, 1994, pp. 962-969.

Grestel, O., et al., "Upgrading SONET Rings with WDM Instead of TDM: An Economic Analysis", OFC/IOOC 1999, Technical Digest, Feb. 21-26, 1999, pp. 75-77.

Ramaswami, R., et al, "Optical Networks: A Practical Perspective", Morgan Kaufmann Publishers, Inc., San Francisco, CA, 1998, pp. 329-335, 405 and 406.

Ahuja, R., et al., "Network Flows" Prentice-Hall, Inc., NJ, Sect 16.4, 1993, pp. 615-620, 627 and 628.

Biagi, S., "Rings, Routing and Revenues", Telephony, Oct. 5, 1998, pp. 45-48.

Daza, J., et al., "Blinded by the Wave-division Light," Network World, Jun. 15, 1998, (accessed Mar. 28, 2006), http://www.networkworld.com/news/tech/0615tech.html.

Flanagan, T., "Fiber Network Survivability", IEEE Communications Magazine, vol. 28, No. 6, Jun. 1990, pp. 46-53.

May, G., et al., "A Distributed Architecture for Survivable Sonet Transport Networks", Global Telecommunications Conference, 1991 (GLOBECOM '91), vol. 3, Dec. 2-5, 1991; pp. 2013-2017.

Mori, T., et al., "Ultra High-speed SONET Fiber-optic Transmission System", Hitachi Review, vol. 47, No. 2, 1998, pp. 79-84.

To, M., et al., "Planning and Deploying a SONET-based Metro Network", IEEE LTS, vol. 2, No. 4, Nov. 1991, pp. 19-23.

Wilk, T., "More Bang for Your Buck, DWDM no Longer too Costly for Hub Interconnects", CED Magazine, Feb. 1, 1998, (accessed Mar. 23, 2006), http://www1.cedmagazine.com/article/CA6261041.html.

Wuttisittikulkij, L., et al., "Design of a WDM Network Using a Multiple Ring Approach", IEEE Global Telecommunications Conference 1997, vol. 1, Nov. 3-8, 1997, pp. 551-555.

Synchronous Optical Network (SONET) Tutorial (selected portions), The International Engineering Consortium (selected portions), site was last updated on Dec. 4, 2004, www.iec.org/tutorials/sonet.

Fiber-optic Technology Tutorial (selected portions), The Internationa Engineering Consortium (selected portions), site was last updated on Dec. 28, 2005, www.iec.org/tutorials/fiber_optic/index.html.

Dense Wavelength Division Multiplexing (DWDM) Performance and Conformance Testing (selected portions), The International Engineering Consortium, site was last updated on Apr. 5, 2003, www.iec.org/tutorials/dwdm_perf/index.html.

Bollobás, B., "Modern Graph Theory", Springer-Verlag, NY, 1998, pp 1-7, 72 and 73.

Papadimitriou, C. et al., "Combination Optimization: Algorithms and Complexity", Dover Publications, Inc., NY, 1998, pp. 20-23.

Myung, Y., et al., "Optimal Load Balancing on SONET Bidirectional Rings", Operations Research, vol. 45, No. 1, Jan.-Feb. 1997, pp. 148-152.

Suurballe, J. W., et al., "A Quick Method for Finding Shortest Pairs of Disjoints Paths", John Wiley & Sons, Inc., Networks, vol. 14, (1984), pp. 3325-336.

Cormen, T., et al., "Introduction to Algorithms", Mass. Institute of Technology (1990), McGraw-Hill Companies, Inc., pp. 527-530.

Balakrishnan, V.K., "Schaum's Outline of Theory and Problems of Graph Theory", McGraw-Hill Companies, Inc. (1997), pp. 1-5 and 28-32.

Doshi, B., et a., "Broadband Network Infrastructure of the Future: Roles of Network Design Tools in Technology Deployment Strategies", IEEE Communications Magazine, May 1998, vol. 36, No. 5, pp. 60-71.

U.S. Appl. No. 60/268,201, filed Feb. 12, 2001, Chow et al.

U.S. Appl. No. 60/270,094, filed Feb. 20, 2001, Chow et al.

Grover W.E., et al., "Optimized Design of Ring-based Survivable Networks", Can. J. Elect. & Comp. Eng., vol. 20, Nov. 3 (1995), pp. 139-149.

Luss, H., et al., "Topological Network Design for SONET Ring Architecture", IEEE Transactions on Systems, Man, and Cybernetics, vol. 28, No. 6, Nov. 1998, pp. 780-790.

Zhang, X., et al., "An Effective and Comprehensive Approach for Traffic Grooming and Wavelength Assignment in SONET/WDM Rings", IEEE/ACM Transactions on Networking, vol. 8, No. 5, Oct. 2000, pp. 608-617.

VPI Virtual Photonics Seminar Folder Handout, bearing title "Speed up Photonics", © VPI 2001 (44 sheets).

Network Design House Seminar Folder Handout, bearing title "Netscene, better networks by design" (ten sheets) (available by 2001).

RSOFT Reaseach Software Folder, bearing title "Building Blocks for Photonics CAD and Simulation Spanning the Range from Nanometers to Megameters" (24 sheets) (available by 2001).

MIL3 Modeling Technologies for the Third Millenium, bearing title "Modeler (Powered by OPNET Simulation Technology) The Network Simulation Power Tool", pp. 1-94 (available by 2001).

Modiano, E. et al., "Designing Survivable Networks using Effective Routing and Wavelength Assignment (RWA)," Optical Fiber Communication Conference, OSA Technical Digest (Optical Society of America, Washington DC, 2001) TuG, pp. TuG5-1 to TuG5-3 (available by 2001).

Scarmozzino, R. et a., "Numerical Techniques for Modeling Guided-Wave Photonic Devices", IEEE Journal of Selected Topics in Quantum Electronics, vol. 6, No. 1, Jan./Feb. 2000, pp. 150-162.

Netscene Product Suite Network Design Software Demo 2001, [printout of CD-ROM], © Network Design House 2001, 218 sheets (available by 2001).

RSoft Research Software CAD Tools For Optoelectronics Demo CD, [printout of CD-ROM], Rsoft, Inc., LinkSIM™, 33 sheets (available by 2001).

* cited by examiner

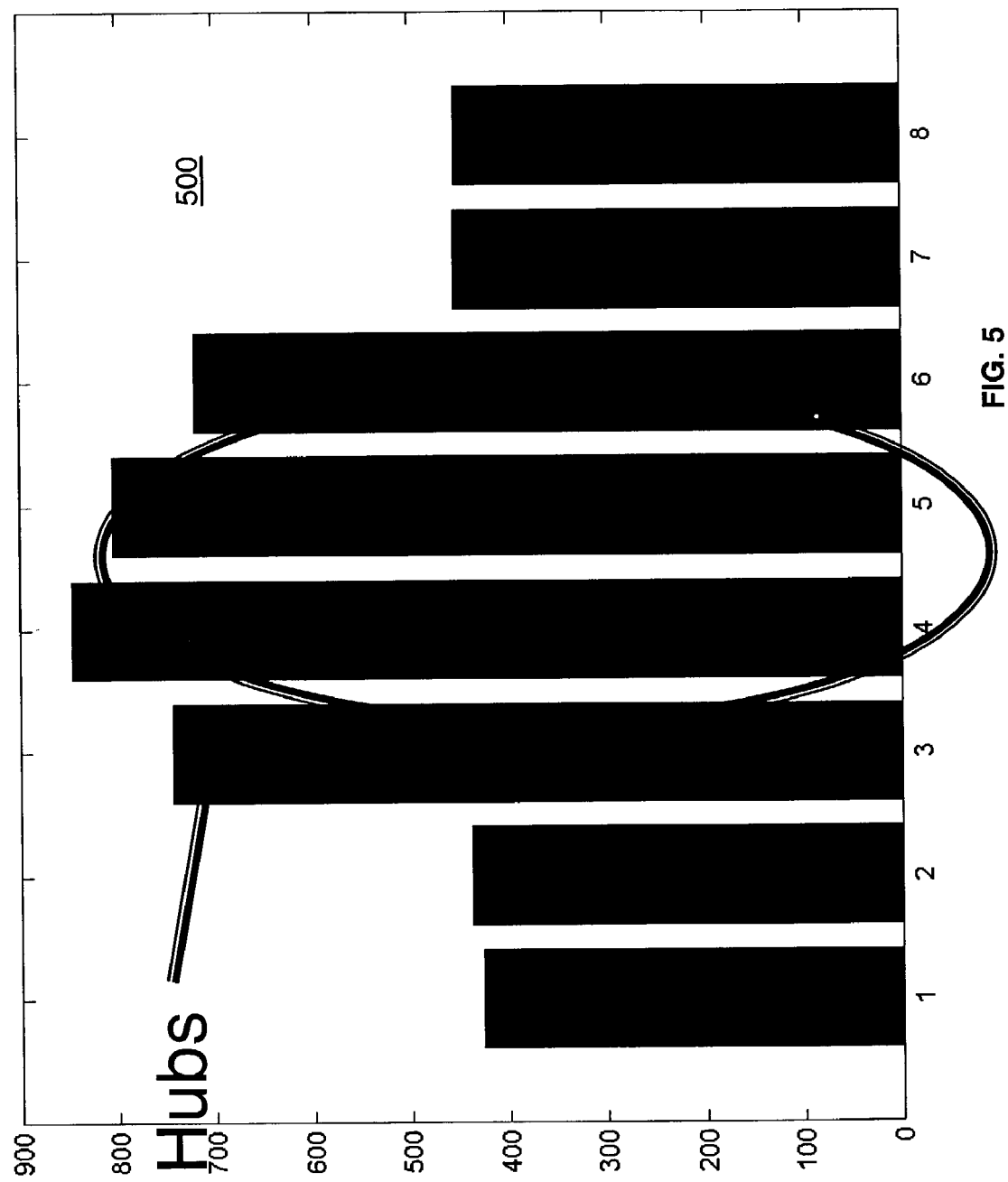

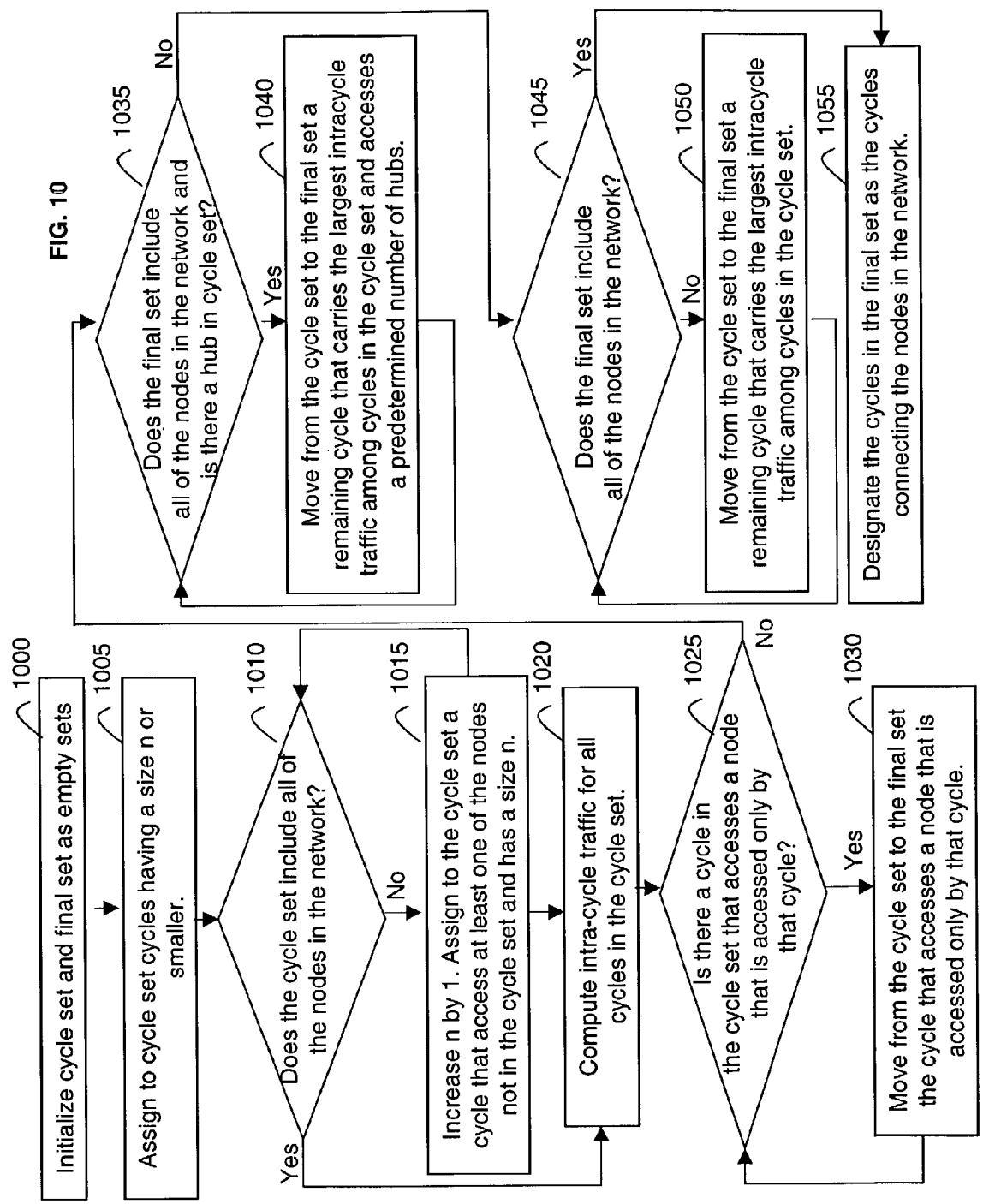

METHODS FOR ASSIGNING RINGS IN A NETWORK

FIELD OF THE INVENTION

The present invention relates to the management of rings in a network. More specifically, the present invention relates to cost-effectively assigning rings in a network when given constraints.

BACKGROUND OF THE INVENTION

In the design of telecommunication networks, traffic is often required to be routed simultaneously along diverse paths in order to maintain a connection if a path is cut. In most instances, these diverse paths form rings that interconnect at many locations on the rings. When the network is designed, the rings can be set up to cost-effectively deliver service. The assignment of those rings can be critical and is often not addressed in network modeling tools.

While much effort has been made to efficiently assign equipment to rings once the rings are established, cost savings can be achieved by efficiently assigning rings in the network. The cost savings in choosing the correct ring structures may far outweigh benefits of efficiently packing sub-optimal ring structures. Thus a method is needed to cost-effectively assign rings in a network.

SUMMARY OF THE INVENTION

A method for managing nodes in a network includes assigning to a cycle set a cycle having a size n (the preferred maximum nodes per cycle) or smaller. If this cycle set does not include the all of the nodes in the network, the method includes increasing n by one and assigning to the cycle set a cycle that accesses at least one of the nodes not currently in the cycle set and has a size n, until the cycle set includes all of the nodes in the network. The method further includes moving from the cycle set to a final set a cycle that accesses a node that is accessed by only that particular cycle. If this final set does not include all of the nodes in the network, the method includes moving a remaining cycle from the cycle set to the final set wherein the remaining cycle carries a largest intracycle traffic among cycles in the cycle set, until the final set includes all of the nodes in the network. Finally, the method includes designating the cycles in the final set as the cycles connecting the nodes in the network.

A method for managing nodes in a network includes: designating a node as a hub; assigning to a final set a cycle having a size n (the preferred maximum nodes per cycle) or smaller and accessing a predetermined number of hubs; and assigning to a cycle set a cycle having a size n. If the cycle set does not include all of the nodes in the network, the method includes increasing n by one and assigning to the cycle set a cycle that accesses at least one of the nodes not in the cycle set and has a size n, until the cycle set includes all of the nodes in the network. The method further includes moving from the cycle set to the final set a cycle that accesses a node that is accessed by only the cycle. If the final set does not include the plurality of nodes, the method includes moving a remaining cycle from the cycle set to the final set wherein the remaining cycle carries a largest intracycle traffic among cycles in the cycle set, until the final set includes all of the nodes in the network. Finally, the method includes designating the cycles in the final set as the cycles connecting the nodes in the network.

A method for managing nodes in a network includes: designating a node as a hub; and assigning to a cycle set a cycle having a size n (the preferred maximum nodes per cycle). If the cycle set does not include all of the nodes in the network, the method includes increasing n by one and assigning to the cycle set a cycle that accesses at least one of the nodes not in the cycle set and has a size n, until the cycle set includes all of the nodes in the network. The method further includes moving from the cycle set to a final set a cycle that accesses a node that is accessed by only the cycle. If the final set does not include all of the nodes in the network and there is a hub in the cycle set, the method includes moving a remaining cycle from the cycle set to the final set wherein the remaining cycle carries a largest intracycle traffic among cycles in the cycle set and accesses a predetermined number of hubs, until the final set includes all of the nodes in the network or until there are no hubs in the cycle set. If the final set does not include all of the nodes in the network, the method includes moving a remaining cycle from the cycle set to the final set, wherein the remaining cycle carries a largest intracycle traffic among cycles in the cycle set, until the final set includes all of the nodes in the network. Finally, the method includes designating the cycles in the final set as the cycles connecting the nodes in the network.

DESCRIPTION OF THE DRAWINGS

The present invention is illustrated by way of example and not by way of limitation in the figures of the accompanying drawings, in which like references indicate similar elements and wherein:

FIG. 5 is a graph illustrating a method for determining hubs, according to an exemplary embodiment of the present invention;

FIG. 10 is a flow diagram illustrating a method for determining express and local cycles, according to an exemplary embodiment of the present invention.

DETAILED DESCRIPTION

The present invention includes cost-effective methods for assigning rings in a network while considering constraints such as for example traffic demands, location of nodes and other service provider preferences or requirements. These methods can minimize the number of rings that each traffic demand traverses by maximizing the amount of traffic on a given ring. As a result, the present invention can provide several advantages to a service provider, such as for example: effective use of bandwidth because more traffic can be put on a given ring; reduction of equipment, such as dual homing equipment that typically resides at inter-ring connections, due to fewer inter-ring connections; and reduction of optical fiber due to fewer rings.

Figure 1:
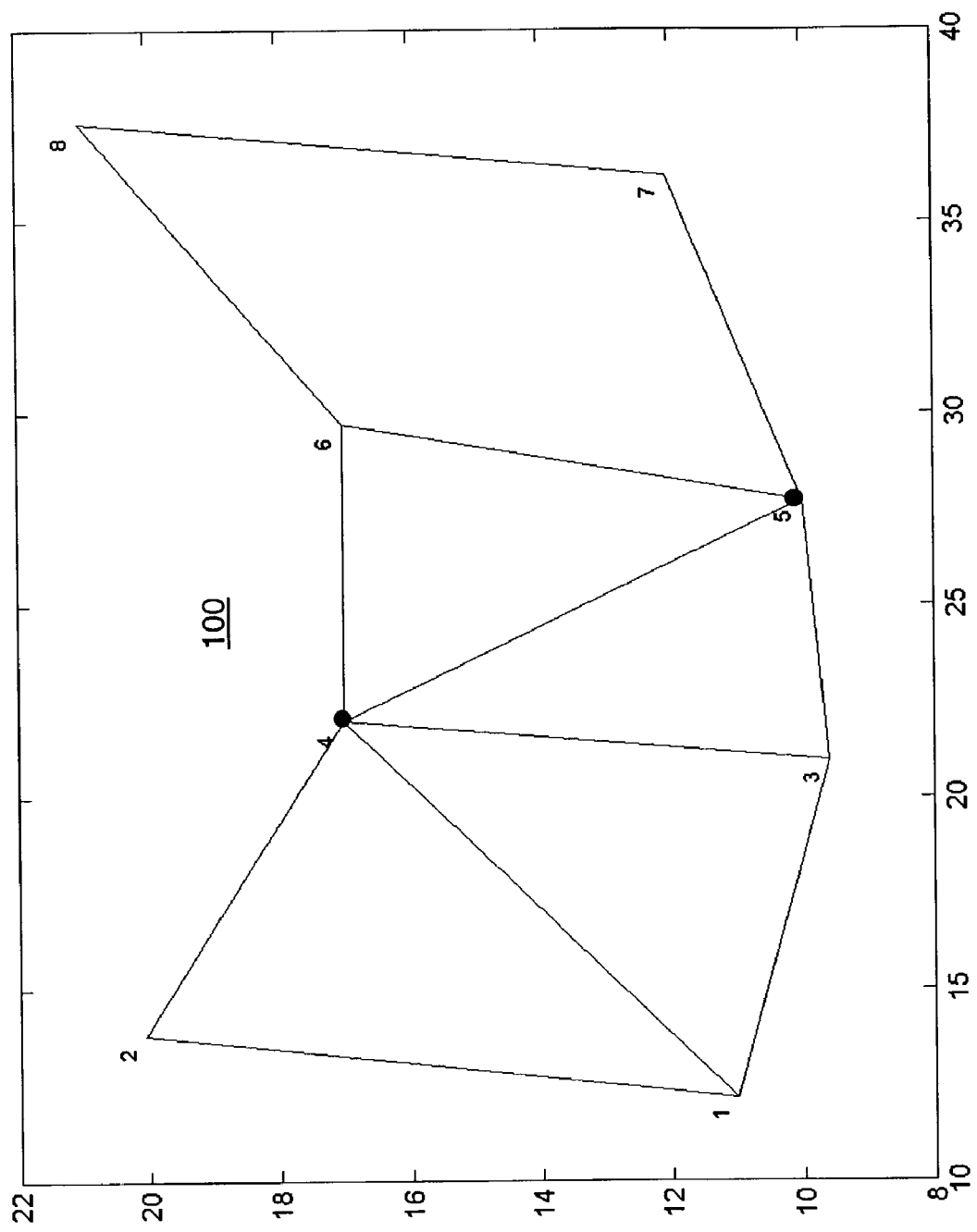
FIG. 1 is an exemplary fiber map of a network.

FIG. 1 illustrates an exemplary fiber map of a network 100 that a service provider could supply to a network planner. In FIG. 1, nodes are at 1, 2, 3, 4, 5, 7 and 8 and links are at 12, 24, 14, 13, 35, 43, 45, 57, 46, 65, 68 and 87. In an exemplary embodiment of the present invention, central offices are placed at each of the nodes and fiber optic cables are placed at each of the links. A service provider could also supply preferences or requirements such as for example: traffic demands for each link, length of a link, and a preferred maximum nodes per ring (which for discussion purposes is referred to as n). With this information, a network planner determines where to cost-effectively assign rings, hubs, and other network equipment.

FIG. 1 illustrates many options for assigning rings. For example, if a service provider has a preferred maximum nodes per ring n=3, rings that fit this preference are at: 124, 143, 345, and 456. Another possible ring is at 5678, even though it has four nodes, one node over the preferred n. Even though a service provider has a preferred maximum nodes per ring n, a service provider may be forced to accept an assignment of a ring having more than n nodes when the layout of the network does not permit a particular ring to have at most n nodes.

Another option for assigning rings is assigning an express ring. An express ring is a ring that has the preferred maximum nodes per ring n and connects local rings together by connecting hubs. It may be desirable to assign a ring that connects hubs because equipment such as cross-connect equipment, which typically resides at a hub, may have interoperability problems with other equipment on a ring. Accordingly, an express ring could be assigned to connect hubs on the same ring. Examples of assigning express rings can be found in network 100. Hubs are located at nodes 4 and 5. Accordingly, a network provider may assign an express ring at for example rings 345, 456 or 1453.

In assigning express rings, the distances between hubs on a ring and the number of hubs on ring may be considered. For example, an express ring with large distances between hubs reduces the number of hubs connected and the amount of cross-connect equipment used on the ring. On the other hand, an express ring with short distances between hubs and thus more cross-connect equipment to support a failure on the ring may provide better protection than a ring with long distances between hubs. To balance these competing objectives, an express ring could be assigned such that a predetermined number of hubs reside on the same ring.

Figure 2:
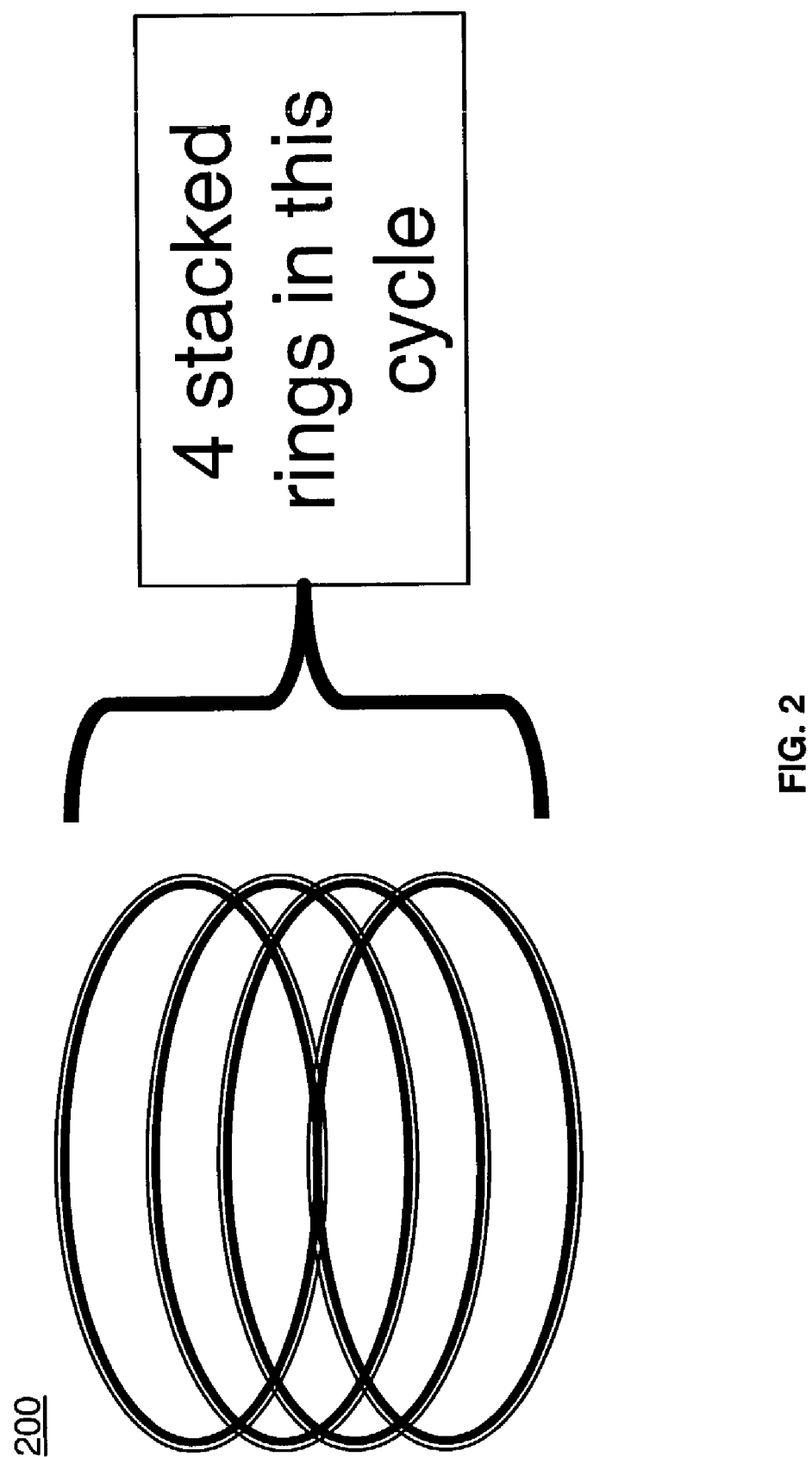
FIG. 2 is an illustration of a set of rings stacked to make a cycle, according to an exemplary embodiment of the present invention.

FIG. 2 illustrates other options for assigning rings. In FIG. 2, rings 200 are stacked to make a cycle or a loop. (A cycle or a loop is a stack of more than one ring.) After a network provider has assigned rings to a network, any later traffic demand must be accommodated. For example, in FIG. 2, one ring could have a bandwidth of OC48 or (2.5 Gb/s per stream). However a later traffic demand could require four times that bandwidth. To accommodate this additional traffic demand, equipment having bandwidth to support the additional traffic demand way be added to the ring. For example, three rings could be stacked on top of the existing ring. The present invention can be implemented with rings and cycles.

Figure 4:
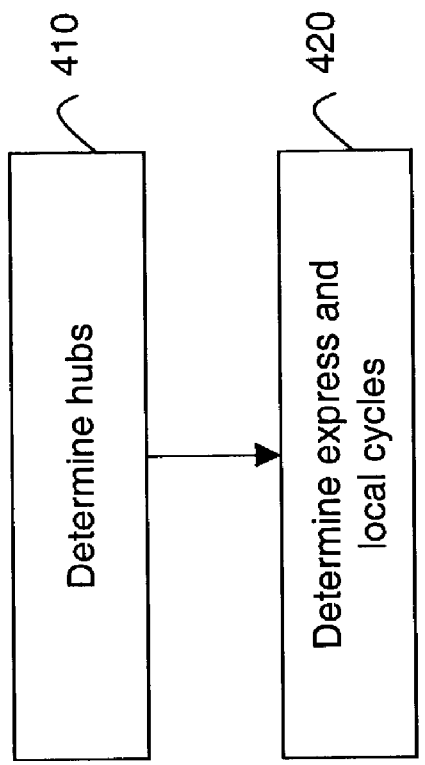
FIG. 4 is a flow diagram illustrating a method for assigning rings, according to an exemplary embodiment of the present invention.
Figure 3:
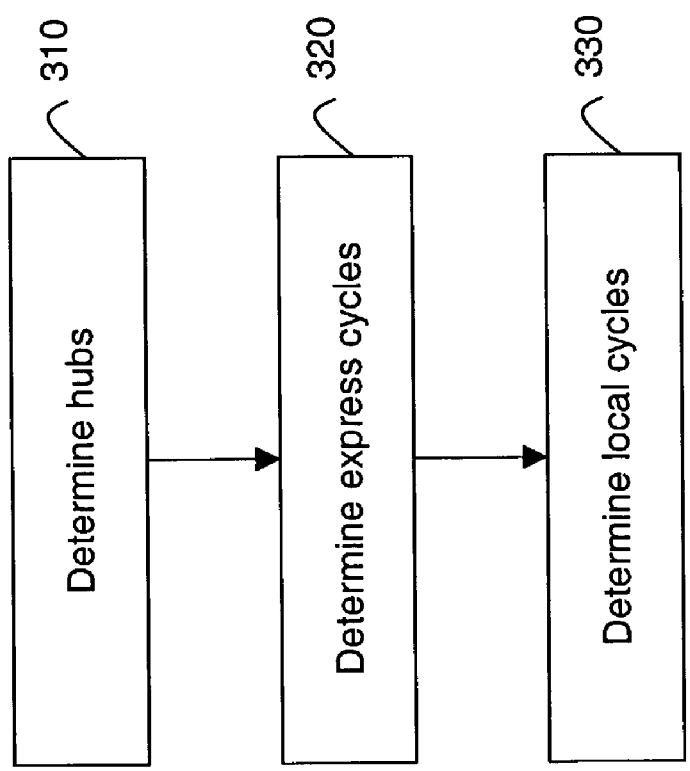
FIG. 3 is a flow diagram illustrating a method for assigning rings, according to an exemplary embodiment of the present invention.
Figure 7:
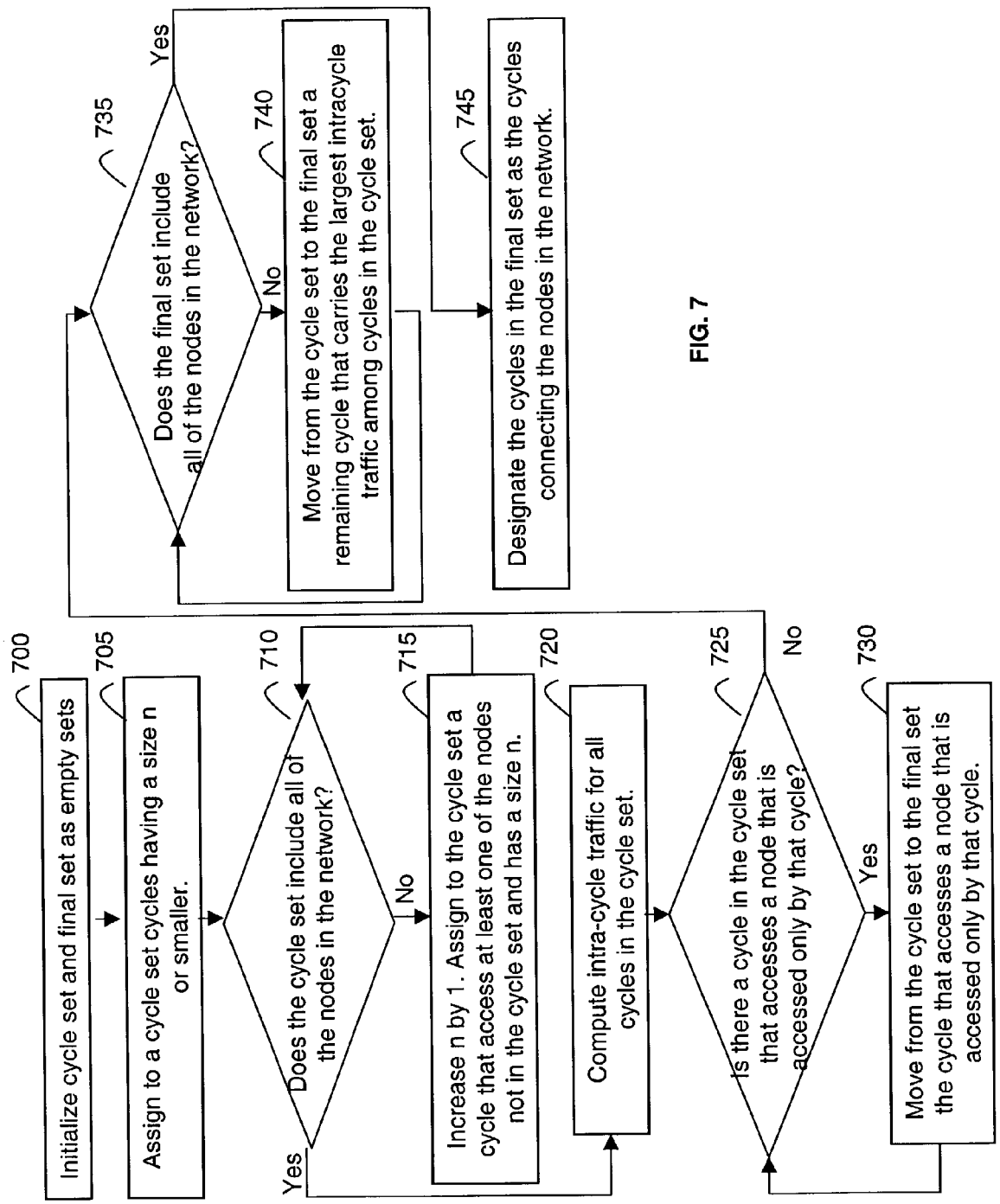
FIG. 7 is a flow diagram illustrating a method for determining local cycles, according to an exemplary embodiment of the present invention.

The flow diagrams in FIGS. 3, 4, 7 and 10 illustrate the methods of assigning rings for exemplary embodiments of the present invention. FIGS. 3 and 4 break down the exemplary embodiment methods into steps 310–330, 410–420. FIG. 7 illustrates a method of performing step 330 (shown in FIG. 3) according to an exemplary embodiment of the present invention. FIG. 10 illustrates a method of performing step 420 (shown in FIG. 4) according to an exemplary embodiment of the present invention. Some of the steps illustrated in the flow diagrams may be performed in an order other than that which is described. Also, it should be appreciated that not all of the steps described in the flow diagrams are required to be performed, that additional steps may be added, and that some of the illustrated steps may be substituted with other steps.

FIG. 3 illustrates an exemplary embodiment method of assigning cycles. At step 310, hubs are determined. Hub determination may be based on for example the amount of terminated traffic at a node, topology (for example, proximity of a hub to another hub), both the amount of terminated traffic at a node and topology, or other reasons such as a service provider's requirements. At step 320, express cycles, cycles that include a hub, are determined. At step 330, local cycles, cycles that do not include a hub, are determined.

FIG. 4 illustrates another exemplary embodiment method of assigning cycles. At step 410, hubs are determined. At step 420, express and local cycles are determined in the same step.

FIG. 5 illustrates determining hubs (step 310 in FIG. 3 and step 410 in FIG. 4) according to an exemplary embodiment. In the embodiment, hub selection is based on largest terminated traffic. FIG. 5 shows a graph 500 of terminated traffic for the nodes (1, 2, 3, 4, 5, 6, 7 and 8) in network 100 (shown in FIG. 1). In graph 500, nodes 4 and 5 carry the largest terminated traffic of all of the nodes in the network. Accordingly, a network planner may decide to place hubs at nodes 4 and 5.

Figure 6:
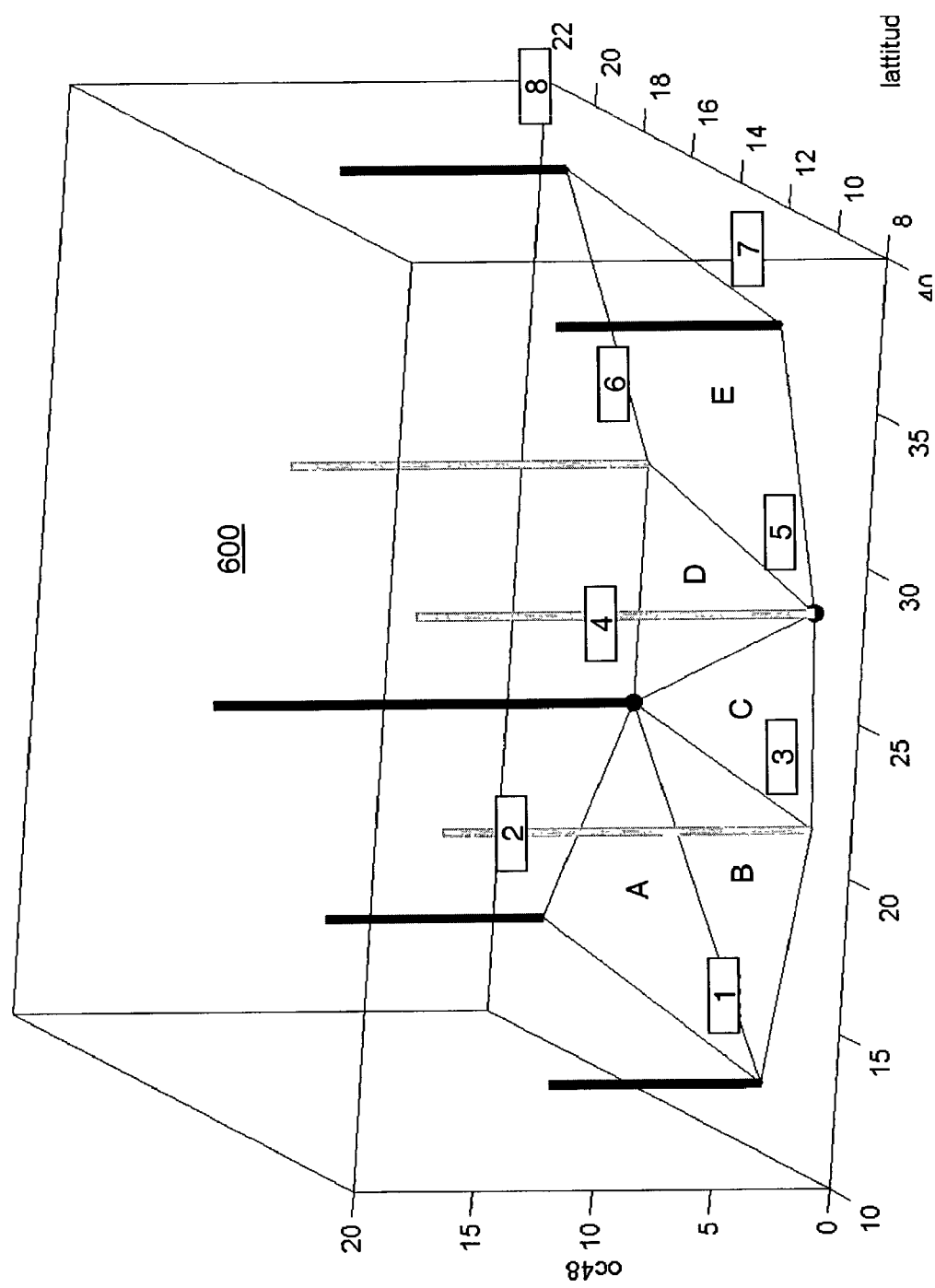
FIG. 6 is a graph illustrating a method for determining hubs, according to an exemplary embodiment of the present invention.

FIG. 6 also illustrates determining hubs (step 310 in FIG. 3 and step 410 in FIG. 4) according to an exemplary embodiment. FIG. 6 shows network 100 (shown in FIG. 1) with an added dimension of terminated traffic. Because nodes 4 and 5 carry the largest terminated traffic of all of the nodes in the network, a network planner may decide to place hubs at these nodes.

Graph 600 (shown in FIG. 6) also demonstrates how to determine express cycles (step 320 in FIG. 3). In an exemplary embodiment, hubs have been selected at nodes 4 and 5. Accordingly, a network provider may place an express cycle at cycle 345 or cycle 456.

Figure 8:
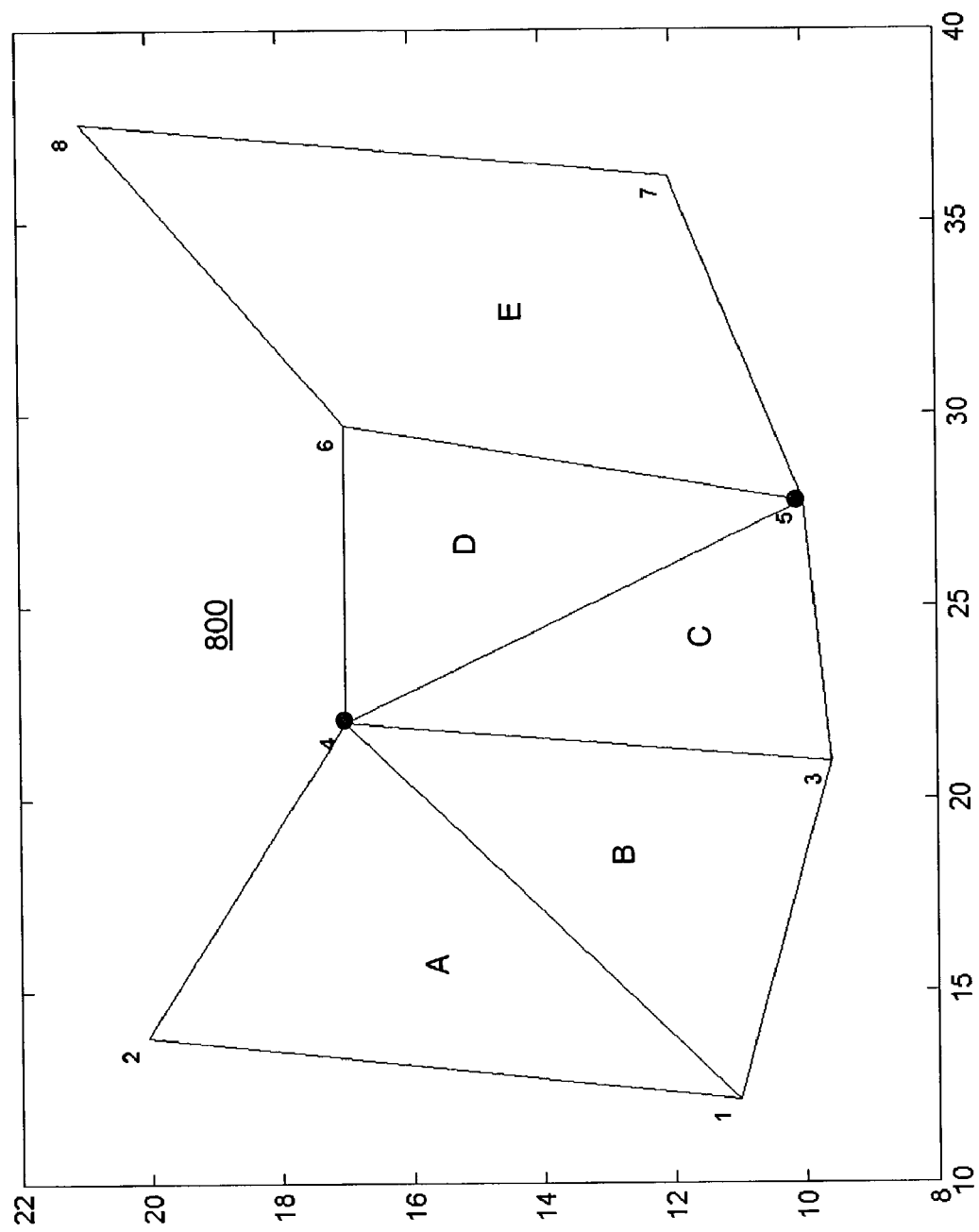
FIG. 8 is an exemplary fiber map of a network.
Figure 9:
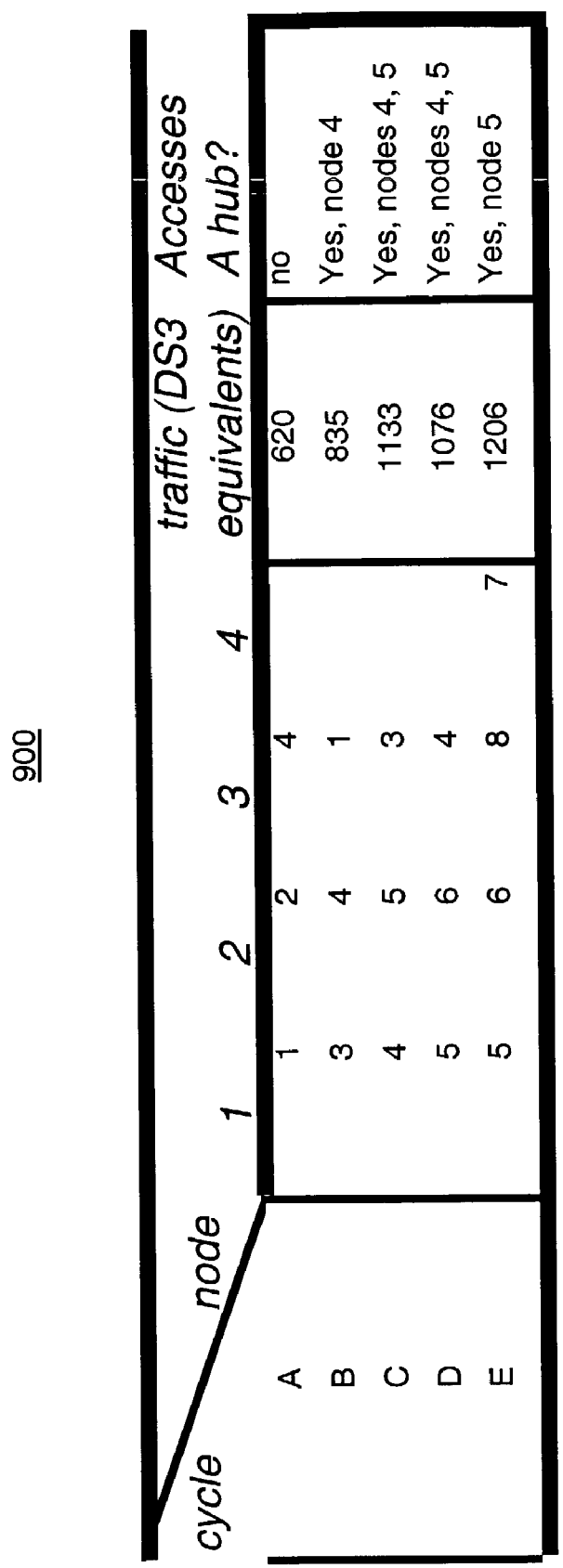
FIG. 9 is a chart illustrating a computation of intracycle traffic for cycles, according to an exemplary embodiment of the present invention.

FIG. 7 illustrates a method of performing step 330 in FIG. 3 (determining local cycles) according to an exemplary embodiment of the present invention. FIG. 7 shows steps 700–740. This embodiment makes use of a cycle set and a final set to assign the cycles in the network. For discussion purposes, an exemplary preferred maximum nodes per cycle n nodes is three. Also, the exemplary network 800 in FIG. 8 will be referenced. In network 800: nodes are at 1, 2, 3, 4, 5, 6, 7 and 8; links are at 12, 24, 14, 13, 35, 43, 45, 57, 46, 65, 68 and 87; hubs are at nodes 4 and 5; and with a preferred n=3, possible cycles are at: A (124), B (143), C (345) and D (456). In addition, chart 900 in FIG. 9, showing an exemplary computation of intracycle traffic for cycles A, B, C, D and E, will be referenced.

At step 700, the cycle set and the final set are initialized to empty sets. At step 705, cycles having a size n or smaller are assigned to a cycle set. Applying this step to network 800 (shown in FIG. 8), the cycles having a size n=3 or smaller are cycles A, B, C and D. These cycles are assigned to the cycle set.

At step 710, the cycle set is checked to see if it includes all of the nodes in the network. If so, the next step is 720. Otherwise, the next step is 715. Currently, the cycle set includes cycles A, B, C and D (or nodes 1, 2, 3, 4, 5 and 6), but does not include nodes 7 and 8. Because the cycle set does not include all of the nodes in the network, the next step is 715. At step 715, n is increased by 1. Also at step 715, a cycle that access at least one of the nodes not in the current cycle set and has a size n is assigned to the cycle set. Applying step 715, n is increased to four. Also, in network 800 (shown in FIG. 8), cycle E accesses at least one of the nodes not in the cycle set (node 7 or node 8) and has a size n=4. Accordingly, cycle E is assigned to the cycle set. The cycle set now includes cycles A, B, C, D and E.

Steps 710 and 715 are repeated until the cycle set includes all of the nodes in the network. Currently, the cycle set includes cycles A, B, C, D and E (or nodes 1, 2, 3, 4, 5, 6, 7 and 8), which are all of the nodes in the network. Accordingly, the next step is 720.

At step 720, the intra-cycle traffic for all cycles in the cycle set is computed. This may be accomplished by summing the traffic between each node in a cycle. The chart 900 (shown in FIG. 9) shows an exemplary computation.

At step 725, the cycle set is checked to see if it includes a cycle that accesses a node that is accessed only by that particular cycle. If there is a cycle of this type, the next step is 730. Otherwise, the next step is 735. In network 800 (shown in FIG. 8), a cycle of this type is cycle A. Cycle A accesses node 2 and node 2 is accessed by cycle A and no other cycle. Accordingly, the next step is 730.

At step 730, the cycle that accesses a node that is accessed only by that cycle is moved from the cycle set to the final set. Cycle A is moved from the cycle set to the final set. The cycle set now includes cycles B, C, D and E and the final set now includes cycle A.

Steps 725 and 730 are repeated until there is no longer a cycle in the cycle set that accesses a node that is accessed only by that particular cycle. For network 800 (shown in FIG. 8), steps 725 and 730 are repeated for cycle E. Cycle E accesses node 8 that is accessed by cycle E and no other cycle. Cycle E is moved from the cycle set to the final set. The cycle set now includes cycles B, C and D and the final set now includes cycles A and E.

At step 735, the final set is checked to see if it includes all of the nodes in the network. If so, the next step is 745. Otherwise, the next step is 740. Currently, the final set does not include all of the nodes in the network. The final set only include cycles A and E (or nodes 1, 2, 4, 5, 6, 7 and 8). Node 3 is not included in the final set. Accordingly, the next step is 740.

At step 740, a remaining cycle that carries the largest intracycle traffic among cycles in the cycle set is moved from the cycle set to the final set. According to the computations in chart 900 (shown in FIG. 9), a cycle of this type is cycle C. Cycle C carries the largest intracycle traffic (1133 DS3) of all of the cycles in the cycle set (cycles B, C and D). Cycle C is moved from the cycle set to the final set. The cycle set now includes cycles B and D and the final set now includes cycles A, C and E.

Steps 735 and 740 are repeated until the final set includes all of the nodes in the network. The final set now includes cycles A, C and E or nodes 1, 2, 3, 4, 5, 6, 7 and 8, which are all of the nodes in the network. Accordingly, the next step is 745.

At step 745, the cycles in the final set are designated as the cycles connecting the nodes in the network. Applying this step, cycles A, C and E are the cycles to connect the nodes in the network.

FIG. 10 illustrates a method of performing step 420 in FIG. 4 (determining express and local cycles) according to an exemplary embodiment of the present invention. FIG. 10 shows steps 1000–1055. This embodiment makes use of a cycle set and a final set to assign the cycles in the network. For discussion purposes, an exemplary preferred maximum nodes per cycle n is three and an exemplary predetermined number of hubs accessed by a cycle is two. Also, exemplary network 800 (shown in FIG. 8) will be referenced. In network 800: nodes are at 1, 2, 3, 4, 5, 6, 7 and 8; links are at 12, 24, 14, 13, 35, 43, 45, 57, 46, 65, 68 and 87; hubs are at nodes 4 and 5; and with a preferred n=3, possible cycles are at: A (124), B (143), C (345) and D (456). In addition, chart 900 (shown in FIG. 9), showing an exemplary computation of intracycle traffic for cycles A, B, C, D and E and the hubs (if any) that each cycle accesses, will be referenced.

At step 1000, the cycle set and the final set are initialized to empty sets. At step 1005, cycles having a size n or smaller are assigned to a cycle set. Applying this step to network 800 (shown in FIG. 8), the cycles having a size n=3 or smaller are cycles A, B, C and D. These cycles are assigned to the cycle set.

At step 1010, the cycle set is checked to see if it includes all of the nodes in the network. If so, the next step is 1020. Otherwise, the next step is 1015. Currently, the cycle set includes cycles A, B, C and D (or nodes 1, 2, 3, 4, 5 and 6), but does not include nodes 7 and 8. Because the cycle set does not include all of the nodes in the network, the next step is 1015. At step 1015, n is increased by 1. Also at step 1015, a cycle that access at least one of the nodes not in the current cycle set and has a size n is assigned to the cycle set. Applying step 1015, n is increased to four. Also, in network 800 (shown in FIG. 8), cycle E accesses at least one of the nodes not in the cycle set (node 7 or node 8) and has a size n=4. Accordingly, cycle E is assigned to the cycle set. The cycle set now includes cycles A, B, C, D and E.

Steps 1010 and 1015 are repeated until the cycle set includes all of the nodes in the network. Currently, the cycle set includes cycles A, B, C, D and E (or nodes 1, 2, 3, 4, 5, 6, 7 and 8), which are all of the nodes in the network. Accordingly, the next step is 1020.

At step 1020, the intra-cycle traffic for all cycles in the cycle set is computed. The chart 900 (shown in FIG. 9) shows an exemplary computation.

At step 1025, the cycle set is checked to see if it includes a cycle that accesses a node that is accessed only by that particular cycle. If there is a cycle of this type, the next step is 1030. Otherwise, the next step is 1035. In network 800 (shown in FIG. 8), a cycle of this type is cycle A. Cycle A accesses node 2 and node 2 is accessed by cycle A and no other cycle. Accordingly, the next step is 1030.

At step 1030, the cycle that accesses a node that is accessed only by that cycle is moved from the cycle set to the final set. Cycle A is moved from the cycle set to the final set. The cycle set now includes cycles B, C, D and E and the final set now includes cycle A.

Steps 1025 and 1030 are repeated until there is no longer a cycle in the cycle set that accesses a node that is accessed only by that particular cycle. For network 800 (shown in FIG. 8), steps 1025 and 1030 are repeated for cycle E. Cycle E accesses node 8 that is accessed by cycle E and no other cycle. Cycle E is moved from the cycle set to the final set.

The cycle set now includes cycles B, C and D and the final set now includes cycles A and E.

At step 1035, the final set is checked to see if it includes all of the nodes in the network and if there is a hub in cycle set. If so, the next step is 1040. Otherwise, the next step is 1045. Currently, the final set does not include all of the nodes of the network. The final set only includes cycles A and E (or nodes 1, 2, 4, 5, 6, 7 and 8). Node 3 is not included in the final set. Further, there is a hub in the cycle set. The cycle set (cycles B, C and D or nodes 1, 3, 4, 5 and 6) includes hubs at nodes 4 and 5. Accordingly, the next step 1040.

At step 1040, a remaining cycle that carries the largest intracycle traffic among cycles in the cycle set and accesses a predetermined number of hubs is moved from the cycle set to the final set. (For discussion purposes, the predetermined number of hubs accessed by a cycle is two.) According to chart 900 (shown in FIG. 9), a cycle of this type of this type is cycle C. Cycle C carries the largest intracycle traffic (1133 DS3) of all of the cycles in the cycle set (cycles B, C and D) and accesses two hubs (nodes 4 and 5). Cycle C is moved from the cycle set to the final set. The cycle set now includes cycles B and D and the final set now includes cycles A, C and E.

Steps 1035 and 1040 are repeated until the final set includes all of the nodes in the network or the cycle set no longer includes a hub. The final set now includes cycles A, C and E or nodes 1, 2, 3, 4, 5, 6, 7 and 8, which are all of the nodes in the network. The next step is 1045.

At step 1045, the final set is checked to see if it includes all of the nodes in the network. If so, the next step is 1055. Otherwise, the next step is 1050 (where a remaining cycle that carries the largest intracycle traffic among cycles in the cycle set is moved from the cycle set to the final set). The final set now includes cycles A, C and E or nodes 1, 2, 3, 4, 5, 6, 7 and 8, which are all of the nodes in the network. Accordingly, the next step is 1055.

At step 1055, the cycles in the final set are designated as the cycles connecting the nodes in the network. Applying this step, cycles A, C, and E are the cycles to connect the nodes in the network.

In the foregoing description, the invention is described with reference to specific example embodiments thereof. It will, however, be evident that various modifications and changes may be made thereto, without departing from the broader spirit and scope of the present invention. For example, embodiments of the present invention may be provided as a computer program product, or software, that may include a machine-readable medium having stored thereon instructions. Further, a machine-readable medium may be used to program a computer system or other electronic device and the readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. The specification and drawings are accordingly to be regarded in an illustrative rather than in a restrictive sense.

What is claimed is:

1. A method for managing a plurality of nodes in a network, comprising:
    initializing a cycle set and a final set to be empty sets;
    assigning to the cycle set a cycle having a size n or smaller, wherein n is a preferred maximum nodes per cycle;
    checking if the cycle set includes the plurality of nodes;
    if the cycle set does not include the plurality of nodes, increasing n by one and assigning to the cycle set a cycle that accesses at least one of the nodes not in the cycle set and has the increased size n, until the cycle set includes the plurality of nodes;
    moving from the cycle set to the final set a cycle that accesses a node that is accessed by only the cycle;
    checking if the final set includes the plurality of nodes;
    if the final set does not include the plurality of nodes, moving a remaining cycle from the cycle set to the final set, wherein the remaining cycle carries a largest intracycle traffic among cycles in the cycle set, until the final set includes the plurality of nodes; and
    designating cycles in the final set as cycles connecting the plurality of nodes in the network.

2. The method of claim 1, further comprising designating as a hub a node from the plurality of nodes.

3. The method of claim 2, further comprising designating as a hub a node with a predetermined amount of terminated traffic.

4. The method of claim 2, further comprising designating as a hub a node with a predetermined distance from other hubs.

5. The method of claim 2, further comprising designating as a hub a node with a predetermined amount of terminated traffic and a predetermined distance from other hubs.

6. The method of claim 1, wherein intracycle traffic comprises a sum of traffic between nodes in a particular cycle.

7. The method of claim 1, further comprising equipping a cycle in the final set to support additional traffic if the additional traffic is required by a new demand.

8. A method for managing a plurality of nodes in a network, comprising:
    designating as a hub a node from the plurality of nodes;
    initializing a cycle set and a final set to be empty sets;
    assigning to the final set a cycle having a size n or smaller, wherein n is a preferred maximum nodes per cycle, and accessing a predetermined number of hubs;
    assigning to the cycle set a cycle having a size n or smaller, wherein n is a preferred maximum nodes per cycle;
    checking if the cycle set includes the plurality of nodes;
    if the cycle set does not include the plurality of nodes, increasing n by one and assigning to the cycle set a cycle that accesses at least one of the nodes not in the cycle set and has the increased size n, until the cycle set includes the plurality of nodes;
    moving from the cycle set to the final set a cycle that accesses a node that is accessed by only the cycle;
    checking if the final set includes the plurality of nodes;
    if the final set does not include the plurality of nodes, moving a remaining cycle from the cycle set to the final set, wherein the remaining cycle carries a largest intracycle traffic among cycles in the cycle set, until the final set includes the plurality of nodes; and
    designating cycles in the final set as the cycles connecting the plurality of nodes in the network.

9. The method of claim 8, wherein designating as a hub a node from the plurality of nodes further comprises designating as a hub a node with a predetermined amount of terminated traffic.

10. The method of claim 8, wherein designating as a hub a node from the plurality of nodes further comprises designating as a hub a node with a predetermined distance from other hubs.

11. The method of claim 8, wherein designating as a hub a node from the plurality of nodes further comprises designating as a hub a node with a predetermined amount of terminated traffic and a predetermined distance from other hubs.

12. The method of claim 8, further comprising equipping a cycle in the final set to support additional traffic if the additional traffic is required by a new demand.

13. A method for managing a plurality of nodes in a network, comprising:

designating as a hub a node from the plurality of nodes;
initializing a cycle set and a final set to be empty sets;
assigning to the cycle set a cycle having a site n or smaller, wherein n is a preferred maximum nodes per cycle;
checking if the cycle set includes the plurality of nodes;
if the cycle set does not include the plurality of nodes, increasing n by one and assigning to the cycle set a cycle that accesses at least one of the nodes not in the cycle set and has the increased size n, until the cycle set includes the plurality of nodes;
moving from the cycle set to the final set a cycle that accesses a node that is accessed by only the cycle;
checking if the final set includes the plurality of nodes;
if the final set does not include the plurality of nodes and there is a hub in the cycle set, moving a remaining cycle from the cycle set to the final set, wherein the remaining cycle carries a largest intracycle traffic among cycles in the cycle set and accesses a predetermined number of hubs, until the final set includes the plurality of nodes or until there are no hubs in the cycle set;
checking if the final set includes the plurality of nodes;
if the final set does not include the plurality of nodes, moving a remaining cycle from the cycle set to the final set, wherein the remaining cycle carries a largest intracycle traffic among cycles in the cycle set, until the final set includes the plurality of nodes; and
designating cycles in the final set as cycles connecting the plurality of nodes in the network.

14. The method of claim 13, wherein designating as a hub a node from the plurality of nodes further comprises designating as a hub a node with a predetermined amount of terminated traffic.

15. The method of claim 13, wherein designating as a hub a node from the plurality of nodes further comprises designating as a hub a node with a predetermined distance from other hubs.

16. The method of claim 13, wherein designating as a hub a node from the plurality of nodes further comprises designating as a hub a node with a predetermined amount of terminated traffic and a predetermined distance from other hubs.

17. The method of claim 13, further comprising equipping a cycle in the final set to support additional traffic if the additional traffic is required by a new demand.

\* \* \* \* \*

UNITED STATES PATENT AND TRADEMARK OFFICE
CERTIFICATE OF CORRECTION

PATENT NO. : 7,346,709 B2  Page 1 of 1
APPLICATION NO. : 10/230004
DATED : March 18, 2008
INVENTOR(S) : David W. Jenkins It is certified that error appears in the above-identified patent and that said Letters Patent is hereby corrected as shown below:

ON COVER PAGE AT (56) OTHER PUBLICATIONS

After "Suurballe, J.W., et al.,": "pp. 3325-336." should read --pp. 325-336.--; and
After "Grover,": "W.E., et al." should read --W.D., et al.--.

Signed and Sealed this

Second Day of September, 2008

JON W. DUDAS
*Director of the United States Patent and Trademark Office*